3,079,294
METHOD OF BONDING CELLULOSIC MATERIALS
James A. Clarke, Lake Jackson, Tex., assignor to The Dow Chemical Company, Midland, Mich., a corporation of Delaware
No Drawing. Filed Sept. 29, 1960, Ser. No. 59,163
2 Claims. (Cl. 156—332)

This invention relates to an improved method for bonding wood and related cellulosic materials. More particularly, it relates to a method whereby a more firmly adherent and stable bond may be made between such cellulosic materials and a polymeric film containing polystyrene as a substantial component.

The art teaches that polystyrene has a low adhesive affinity for cellulose. This property is thought to be due to polystyrene's low polarity and its high tack temperature, the latter indicating stronger cohesive than adhesive forces. According to De Bruyne's rule of adhesion, strong joints cannot be made with polar adherents and non-polar adhesives.

I have found that a strong and stable bond between cellulosic materials and a polymer containing polystyrene as a substantial component may be obtained by applying to said cellulosic materials a mixture comprising monomeric styrene and an acidic cross-linking agent, which mixture has been partially polymerized to a soft gel, and thereafter subjecting the coated materials to conditions causing further polymerization until a hard and firmly bonded mass is obtained. I have found that bonds made by my new process are not only of high strength but also retain most of their strength after soaking in cold or even boiling water. The presence of the cross-linking agent also imparts other advantages to the adhesive bond such as added resistance to attack by organic solvents and lessened cure times at lower temperatures in the preparation of the bond.

The acidic cross-linking agents found effective for the purpose are acrylic anhydride, methacrylic anhydride, and mixtures of these. Other unsaturated acid anhydrides of similar structure will act in a like manner. These acidic cross-linking agents may also be used in conjunction with polyfunctional cross-linking compounds of other types such as divinylbenzene and the like.

In order to obtain full benefit of the advantageous properties thereby supplied, it is necessary to add at least about 4% by weight of these unsaturated acid anhydrides to a styrene adhesive composition. Lesser amounts, however, will confer some improvement on bonds so made. Other cross-linking agents which may be used are in addition to the above-mentioned amounts.

Polymerization of the styrene-cross-linking agent mixture may be facilitated by inclusion of any of known suitable free radical polymerization catalysts. I prefer to use an organic peroxide such as benzoyl peroxide in such amounts as are known to be effective.

Cellulosic materials found to be strongly bound by such an adhesive mixture are wood in various forms, such as sheets for forming veneers and plywood, wood shavings, splinters, sawdust, and the like, from which may made composition sheets or other molded forms, and also derivatives of wood such as paper and cardboard.

A mixture of styrene and acidic cross-linking agent such as previously described is easily polymerized in the presence of a polymerization catalyst by heating to 70–80° C. for a few minutes, whereupon a soft clear gel is formed which contains about 80–95% of the styrene content as monomeric styrene. A gel at this stage of polymerization may be stirred or beaten to obtain a material of the appearance and consistency of applesauce, essentially small pieces of gel with a small amount of free liquid present. This stirred soft gel is a convenient form of material to handle, since it has sufficient body and viscosity to be applied to wood or other such material in the proper amount and uniformity without substantial loss by runoff or formation of voids in the bond. The bond then formed by further polymerization on application of heat and pressure is thought to owe its improved properties to the more polar nature of the acidic cross-linking agent and possibly also to a chemical bond which may form between some of the acidic cross-linking agent and cellulosic hydroxyl groups. Additional advantage is obtained when the monomeric styrene present in the soft gel soaks into the porous wood surface and on further polymerization thereby forms a mechanical bond by imbedding of the polymerized plastic in the structure of the wood. This final polymerization and bonding is carried out under conditions known in the art, that is, suitably at temperatures in the approximate range of 120–150° C., and under pressures of the order of 50–200 p.s.i.

I prefer to use a composition comprising styrene, about 4–25% methacrylic anhydride, and a catalytically effective amount of benzoyl peroxide. The composition may also contain other cross-linking agents such as divinylbenzene in a quantity of the same order as that of the methacrylic anhydride and it may contain fillers such as nut shell flour and others used in plywood manufacture. The composition is heated at about 70–80° C. until a soft gel of suitable body and viscosity is formed. Usually only a very few minutes is required to reach this stage. The composition is then cooled, applied as desired to the material to be bonded, and the whole subjected to pressure and heat as previously described until the polymer has set to a hard mass to make a rigid and firmly bonded product.

Examples 1 and 2 illustrate two preferred embodiments of my invention.

EXAMPLE 1

A mixture containing 50 cc. styrene inhibited with 0.002% tertbutylcatechol, 2 cc. methacrylic anhydride, and 0.5 g. benzoyl peroxide was heated to 78° C. and thickening occurred in five minutes. Uninhibited styrene will serve as well. The mixture was cooled and formed a clear soft gel. A 7 inch x 7 inch sheet of ⅛ inch, 3 ply birch plywood was assembled using 13.4 g. of the above gel. The plywood was cured at 127° C. and 50 lbs./sq. in. for 30 minutes. Shear strength values for this plywood averaged 300 lbs./sq. in. dry and 200 lbs./sq. in. after soaking in boiling water for two 4-hour periods (as specified in Commercial Standard CS 35–56 for hardwood plywood, published by the U.S. Department of Commerce). There was no delamination during the boiling water test.

EXAMPLE 2

Two gels were prepared as in Example 1 from the following mixtures:

Gel I—
    89% styrene
    10% methacrylic anhydride
    1% benzoyl peroxide
Gel II—
    84% styrene
    15% solution of 55% divinylbenzene in diethylbenzene
    1% benzoyl peroxide Equal weights of Gels I and II were mixed and 15% by weight of walnut shell flour was added. Birch plywood was prepared with this mixture as in Example 1 except that it was cured 4 minutes at 132° C. and 50 lbs./sq. in., then 4 minutes at 132° C. and 200 lbs./sq. in. The plywood thus prepared had the following properties:

| Condition of Plywood | Shear Strength, lbs./sq. in. |
| --- | --- |
| Dry, as prepared | 406 (19% wood failure). |
| Soaked 16 hrs. in cold water, dried 8 hrs. at 60° C., repeated 5 times and tested wet | 255 (10% wood failure). |
| Two 4 hr. periods in boiling water as specified in CS 35-56 | 265 (10% wood failure). |

The term "wood failure" refers to that portion of the sheared surface of a plywood sample where the break between plies has taken place within the wood itself and not within the adhesive bond nor between the wood surface and the adhesive. Wood failure is expressed as the estimated percentage of the fractured surface wherein this type of break has occurred. A relatively high value for wood failure therefore indicates a superior bond having a strength equal to or better than the wood itself.

A series of tests was made with gels containing varying amounts of methacrylic anhydride (MAH). The experimental procedure was similar to that used in Example 1. The results are shown in Table 1.

*Table 1*

| Percent MAH in gel | Birch plywood shear strength, lbs./sq. in. | |
| --- | --- | --- |
| | Dry | After boiling water test (as specified in CS 35-56) |
| 0.1 | did not adhere | |
| 1.0 | 310 | delaminated. |
| 10.0 | 290 | 275. |
| 20.0 | 245 | not tested. |
| 100 | polymer brittle | |

A gel made with styrene containing 8% by weight divinylbenzene as the sole cross-linking agent was used to prepare birch plywood as in Example 1. The plywood so prepared delaminated in boiling water.

I claim:
1. In a process for bonding wood and wood products by polymerizing in contact therewith a polymerizable composition, the improvement wherein said composition is a partially polymerized mixture consisting essentially of from about 75% to about 99% by weight of styrene and from about 25% to about 1% by weight of a crosslinking agent selected from the group consisting of acrylic anhydride, methacrylic anhydride, mixtures thereof, and mixtures thereof with divinylbenzene.

2. The process of claim 1 wherein the partially polymerized mixture consists essentially of 75–96% by weight of styrene and 25–4% of methacrylic anhydride, about 80–95% of the styrene being in the monomeric form.

References Cited in the file of this patent
UNITED STATES PATENTS

| 1,933,052 | Fikentscher et al. | Oct. 31, 1933 |
| 2,521,470 | Matheson | Sept. 5, 1950 |
| 2,860,109 | Abel et al. | Nov. 11, 1958 |
| 2,873,226 | Davies et al. | Feb. 10, 1959 |

FOREIGN PATENTS

| 532,022 | Great Britain | Jan. 15, 1941 |